Patented Feb. 3, 1942

2,271,818

UNITED STATES PATENT OFFICE 2,271,818

DISTEMPER VACCINE AND METHOD OF PREPARING THE SAME

Robert G. Green, Minneapolis, Minn., assignor to Fromm Laboratories, Inc., Hamburg, Wis., a corporation of Wisconsin No Drawing. Application February 6, 1939, Serial No. 254,971

4 Claims. (Cl. 167—78)

In my Patent No. 2,136,131, patented November 8, 1938, I have described a method of preparing a distemper vaccine for foxes and dogs by passing the virus of typical canine distemper serially through ferrets. By this treatment, within reasonable limits, the virus becomes progressively more virulent for the ferrets but progressively less virulent for foxes and dogs and other members of the family Canidae. Up to more than fifty passages through ferrets the virus shows this increasing virulence for ferrets and the decreasing virulence for dogs and foxes. It is of course possible that the passage of the virus through the ferrets might be continued for so long that it would show no further increase in virulence for ferrets. On the other hand it is conceivable that the modification of the virus by passage through ferrets might be carried so far that it would no longer serve to immunize foxes and dogs. However, as appears in said patent, an appreciable modification of the virus becomes apparent after from five to ten passages through ferrets and this modification continues through more than fifty passages to the point at which it produces only a mild disease in foxes accompanied by imunization with a death rate of less than 0.5%.

I have now found that the distemper virus demonstrated by Carré and more clearly defined by Laidlaw and Dunkin, i. e., the typical canine distemper virus is capable of modification by serial passage through dogs, foxes and other members of the family Canidae to produce a vaccine capable of immunizing minks and closely related animals against the disease. The modified virus is characterized by the lowering of the mortality rate when injected into minks but it will be understood that this reference to minks is used only for the purpose of identification and it is not to be understood therefrom that it is useful only as a vaccine for minks. It may as a matter of fact be used as an immunizing vaccine also for all related animals such as ferrets, weasels, otters, and other members of the family Mustelidae.

My invention may be defined therefore as being a distemper virus which has been modified by serial passage through dogs and foxes and other members of the family Canidae as evidenced by a material lowering of the normal canine distemper mortality rate when injected into minks and the process of making the vaccine.

Modification of the virus may be accomplished by serial passage through a single species such as foxes or by alternating serial passage through two species or in any other manner serially through through a plurality of species of Canidae.

As a part of my investigations on distemper in foxes, dogs and other animals, I have found that this virus may be readily recognized in them by the presence of cytoplasmic inclusions in certain cells, and that distemper may be further and more accurately defined by the demonstration of these inclusions. I have identified the virus in various animals and have studied the transmission of the disease among these animals from one species to another, and have made the following findings.

As the distemper virus is found in nature it has the ability to produce virulent infections in diverse animal species, and as different natural strains are isolated they may vary somewhat in the degree of virulent disease which they produce in different animals, but not to a significant degree.

I have further found that by serial passage, a distemper virus having the ability at one time to infect several diverse species of animals with a virulent disease can be modified in a definite manner in some species to produce a mild and symptomless infection in certain other species.

Specifically I have found that the distemper virus passed serially through foxes and other members of the family Canidae and particularly when inoculation is made by direct brain injection, develops after about ten passages a greatly lessened virulence for minks and will produce only a mild infection which however immunizes the minks against virulent distemper.

The modification is plainly evident after about ten serial passages and in all cases results in a marked degree of modification as the number of passages is increased. In a typical case, passage of a distemper virus through foxes by brain inoculation serially for twenty virus generations results in a virus which will not show, usually, any mortality effect when injected into as many as ten minks.

The serial transmission may be accomplished by inoculating the animal of the family Canidae, e. g. the fox by direct brain injection with active distemper virus and when the animal sickens or dies, using infected tissue, e. g. spleen emulsion from it to infect another animal of the same family or species, e. g. the fox and so on for a sufficient number of passages to produce the desired degree of modification of the virus.

The modified virus is used to protect animals of the family Mustelidae, e. g. the mink by infecting them, e. g. by injection. Known expedients such as attenuation of the modified virus, for instance, by drying or other known or usual method of attenuation or the use of the modified virus with serum may be employed. Vaccines produced by serial passage through any two species of Canidae are distinguishable by precipitin tests but they are essentially identical in so far as they are practically harmless to and capable of immunizing minks and other Mustelidae.

I claim:

1. Method of modifying distemper virus for the production of a vaccine capable when injected into minks, of immunizing the same against typical distemper which comprises passing the virus serially through animals of the family Canidae for a sufficient number of passages to materially reduce the normal distemper death rate of minks injected therewith.

2. Method as defined in claim 1 in which the virus is passed serially for at least ten generations.

3. A distemper vaccine comprising distemper virus modified by serial passage through animals of the family Canidae for a sufficient number of passages to materially reduce the normal distemper death rate in minks injected therewith, said vaccine being capable of immunizing minks against distemper.

4. A distemper vaccine as defined in claim 3 produced by serial passage for at least ten generations.

ROBERT G. GREEN.